United States Patent
Woodrum

(10) Patent No.: US 11,655,625 B2
(45) Date of Patent: May 23, 2023

(54) FLOODWATER REDISTRIBUTION ASSEMBLY

(71) Applicant: Donna Woodrum, San Diego, CA (US)

(72) Inventor: Donna Woodrum, San Diego, CA (US)

(*) Notice: Subject to any disclaimer, the term of this patent is extended or adjusted under 35 U.S.C. 154(b) by 201 days.

(21) Appl. No.: 17/124,054

(22) Filed: Dec. 16, 2020

(65) Prior Publication Data

US 2022/0186484 A1 Jun. 16, 2022

(51) Int. Cl.
*E03F 1/00* (2006.01)
*G05D 16/20* (2006.01)
*G05D 16/00* (2006.01)
*E03F 7/02* (2006.01)
*E03B 1/04* (2006.01)
*E03F 5/02* (2006.01)

(52) U.S. Cl.
CPC .............. *E03F 1/003* (2013.01); *E03B 1/042* (2013.01); *E03F 5/02* (2013.01); *E03F 7/02* (2013.01); *G05D 16/024* (2019.01); *G05D 16/202* (2013.01)

(58) Field of Classification Search
CPC .... E03F 1/003; E03F 7/02; E03F 5/02; G05D 9/12; G05D 16/024; G05D 16/202; E03B 1/042
USPC .......... 137/368, 236.1; 239/201; 405/36, 53, 405/54, 55
See application file for complete search history.

(56) References Cited

U.S. PATENT DOCUMENTS

| | | | | |
|---|---|---|---|---|
| 1,495,858 A * | 5/1924 | McGinnis | ............. | F16K 27/006 137/454.2 |
| 4,106,338 A * | 8/1978 | Castle | ............. | G01F 23/32 73/302 |
| 4,334,386 A * | 6/1982 | Burcombe | ............. | A01G 31/02 47/62 E |
| 4,527,927 A * | 7/1985 | Bucherre | ............. | E02B 13/00 405/36 |
| 4,589,798 A * | 5/1986 | Milly | ............. | B01D 24/04 405/36 |
| 4,865,069 A * | 9/1989 | Lacey | ............. | F04F 10/00 405/36 |
| 4,934,404 A * | 6/1990 | DeStefano | ............. | E03B 3/03 137/565.33 |
| 5,192,426 A * | 3/1993 | DeCoster | ............. | E03B 1/04 210/170.07 |

(Continued)

FOREIGN PATENT DOCUMENTS

WO WO-2020122923 A1 * 6/2020 ............... E03B 1/00

*Primary Examiner* — William M McCalister

(57) ABSTRACT

A floodwater redistribution assembly for redirecting flood waters to a predetermined location for irrigation and municipal water service includes a subterranean vault that is positioned adjacent to a body of water known for periodic flooding. An inlet pipe is integrated into the subterranean vault to direct the water from the body of water into the subterranean vault. An outlet pipe is integrated into the subterranean vault to direct the water outwardly to a predetermined location for the purposes of irrigation and municipal water service. A ball valve is positioned within the subterranean vault to facilitate the water to flow into the outlet pipe. A ball valve control unit is coupled to the ball valve. The ball valve control unit is in remote communication with a remote control source and the ball valve control unit actuates the ball valve between an open position and a closed position.

15 Claims, 3 Drawing Sheets

(56) References Cited

U.S. PATENT DOCUMENTS

| | | | | |
|---|---|---|---|---|
| 5,234,286 A * | 8/1993 | Wagner | E03B 11/02 | 220/4.24 |
| 5,322,387 A * | 6/1994 | Heine | E03F 1/002 | 210/519 |
| 5,375,944 A * | 12/1994 | Kotani | B09B 1/00 | 405/129.2 |
| 5,487,621 A * | 1/1996 | Takada | F04D 29/669 | 405/80 |
| 5,810,510 A * | 9/1998 | Urriola | E03F 1/005 | 210/170.03 |
| 5,862,633 A * | 1/1999 | Van Ells | F24F 5/00 | 135/117 |
| 5,909,983 A * | 6/1999 | McGee, Jr. | A62C 35/026 | 169/14 |
| 6,382,237 B1 * | 5/2002 | Takai | E03B 3/02 | 220/567.1 |
| 6,796,325 B1 * | 9/2004 | Courier | E03F 5/106 | 52/16 |
| 7,025,076 B2 * | 4/2006 | Zimmerman, Jr | E03B 1/04 | 405/36 |
| 7,066,197 B1 * | 6/2006 | Gray | E03B 3/02 | 137/554 |
| 7,207,748 B1 * | 4/2007 | Urban | E03B 1/042 | 405/51 |
| 7,901,190 B2 * | 3/2011 | Gray | F04D 15/0209 | 417/43 |
| 9,832,939 B2 * | 12/2017 | Russell | A01G 25/00 | |
| 10,017,920 B1 * | 7/2018 | Huxford | E03F 1/002 | |
| 10,465,409 B1 * | 11/2019 | Barber | F04D 13/16 | |
| 10,526,776 B1 * | 1/2020 | McNeill | E03F 5/10 | |
| 10,619,331 B2 * | 4/2020 | Huxford | E04D 13/08 | |
| 10,968,589 B2 * | 4/2021 | Schafer | E02B 13/02 | |
| 11,071,259 B2 * | 7/2021 | McClain | E03F 1/00 | |
| 2005/0127315 A1 * | 6/2005 | Hollingsworth | E03B 7/071 | 251/129.04 |
| 2011/0174706 A1 * | 7/2011 | Russell | A01G 25/00 | 405/36 |
| 2011/0188933 A1 * | 8/2011 | Burkhardt | E03B 3/40 | 405/38 |
| 2014/0064852 A1 * | 3/2014 | Liwix | B65G 5/00 | 137/565.17 |
| 2015/0218010 A1 * | 8/2015 | Benavides | B65G 5/00 | 210/741 |
| 2019/0177963 A1 * | 6/2019 | Brant | E03F 7/00 | |
| 2019/0226192 A1 * | 7/2019 | Bryant | E03F 5/16 | |
| 2020/0393184 A1 * | 12/2020 | Pareto | F03B 17/06 | |
| 2021/0333033 A1 * | 10/2021 | Pareto | E03B 7/12 | |
| 2022/0186484 A1 * | 6/2022 | Woodrum | G05D 16/024 | |

* cited by examiner

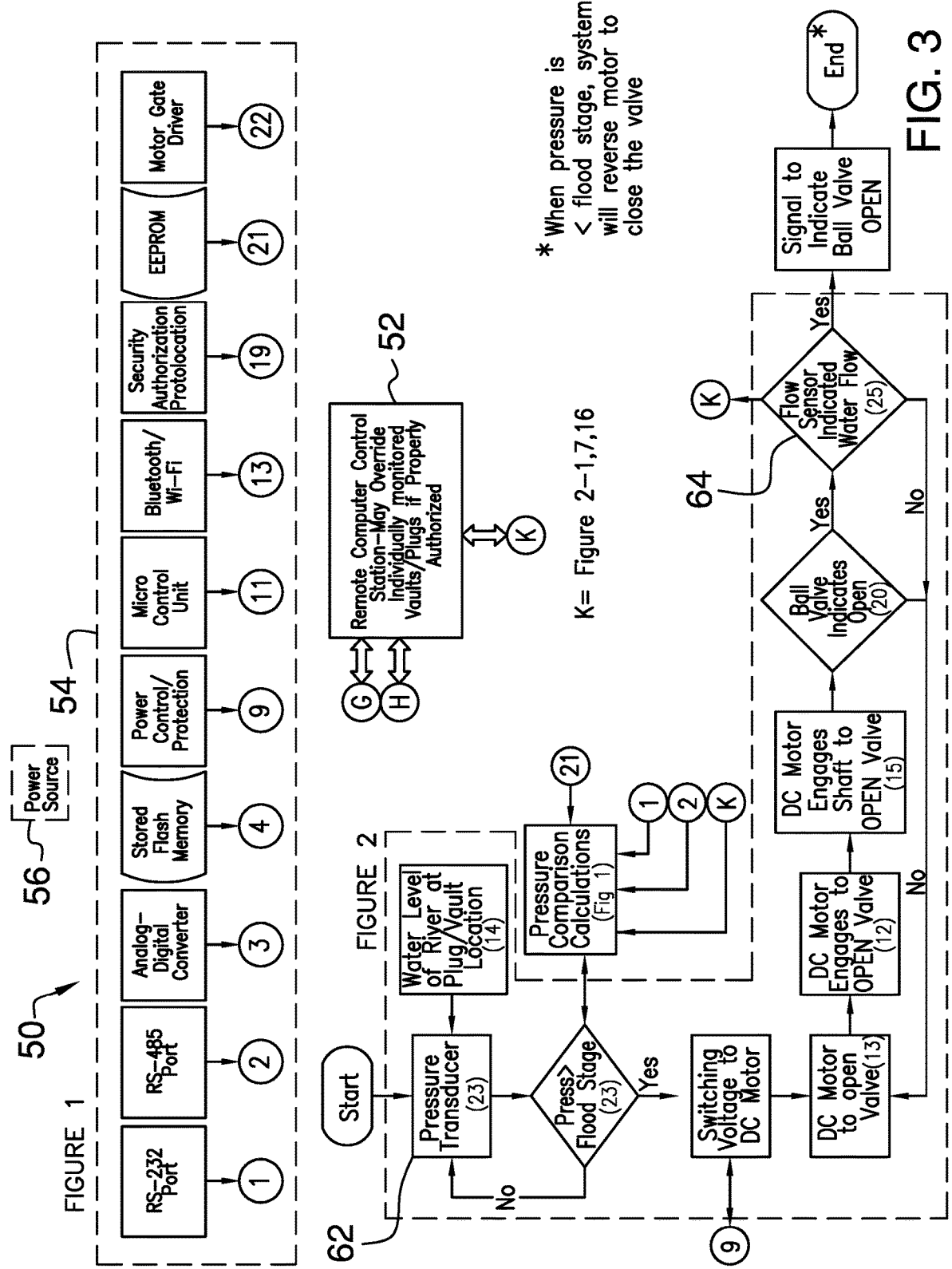

FLOODWATER REDISTRIBUTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to floodwater devices and more particularly pertains to a new floodwater device for routing floodwaters to a predetermined location for the purposes of irrigation and municipal water service.

(2) Description of Related Art Including Information Disclosed Under 37 CFR 1.97 and 1.98

The prior art relates to floodwater devices including an underground water channel system that includes vertical shafts and a pumping station for pumping rain water into a municipal water service system. The prior art discloses a variety of flood water repository systems for storing flood waters for subsequent distribution to a predetermined location. Additionally, the prior art discloses a variety of rainwater collection systems for collecting and subsequently directing rain water to a predetermined location.

BRIEF SUMMARY OF THE INVENTION

An embodiment of the disclosure meets the needs presented above by generally comprising a subterranean vault that is positioned adjacent to a body of water known for periodic flooding. An inlet pipe is integrated into the subterranean vault to direct the water from the body of water into the subterranean vault. An outlet pipe is integrated into the subterranean vault to direct the water outwardly to a predetermined location for the purposes of irrigation and municipal water service. A ball valve is positioned within the subterranean vault to facilitate the water to flow into the outlet pipe. A ball valve control unit is coupled to the ball valve. The ball valve control unit is in remote communication with a remote control source and the ball valve control unit actuates the ball valve between an open position and a closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a logic tree view of an embodiment of the disclosure.

DETAILED DESCRIPTION OF THE INVENTION

Figure 1:
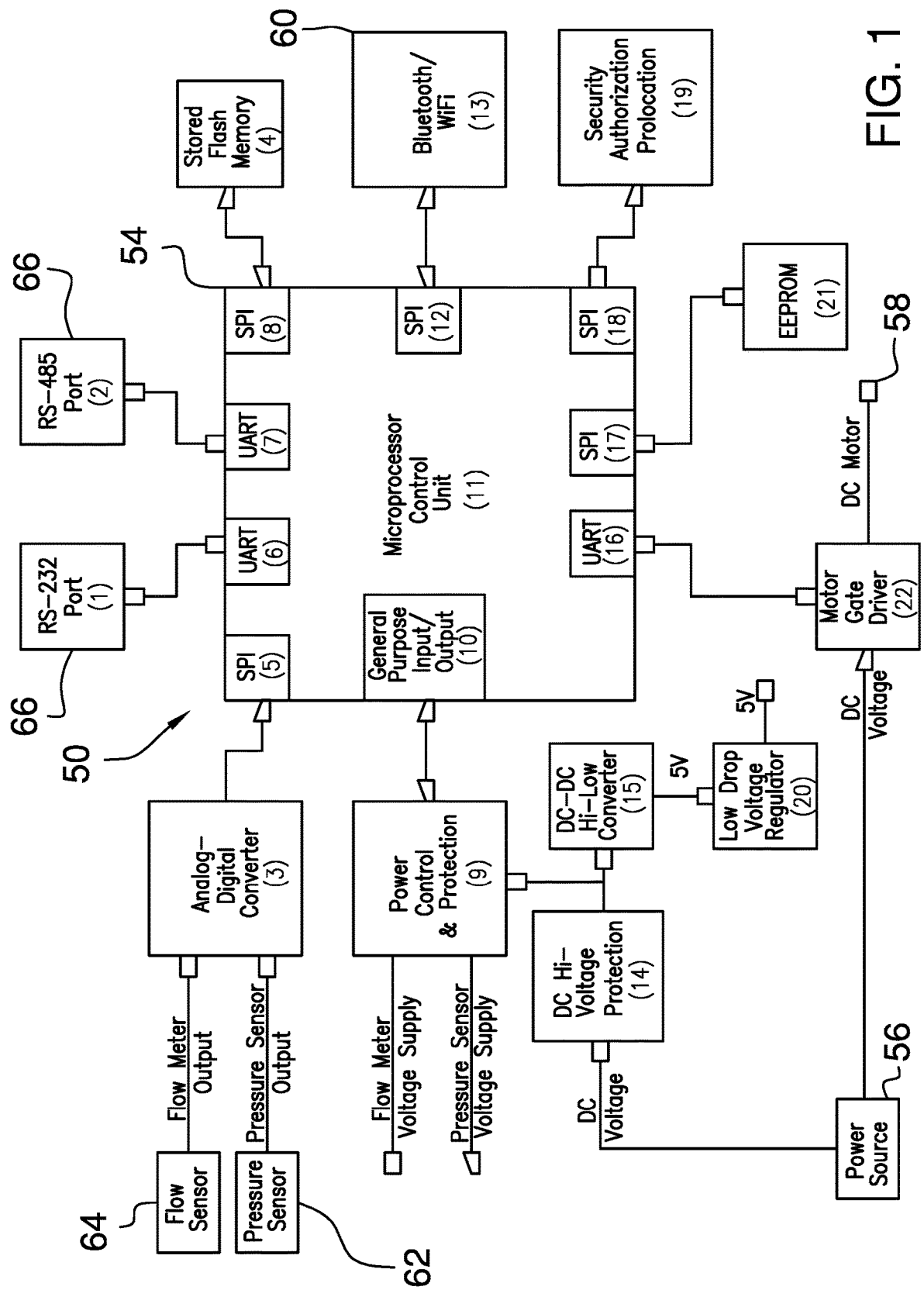
FIG. 1 is a schematic view of a floodwater redistribution assembly according to an embodiment of the disclosure.
Figure 2:
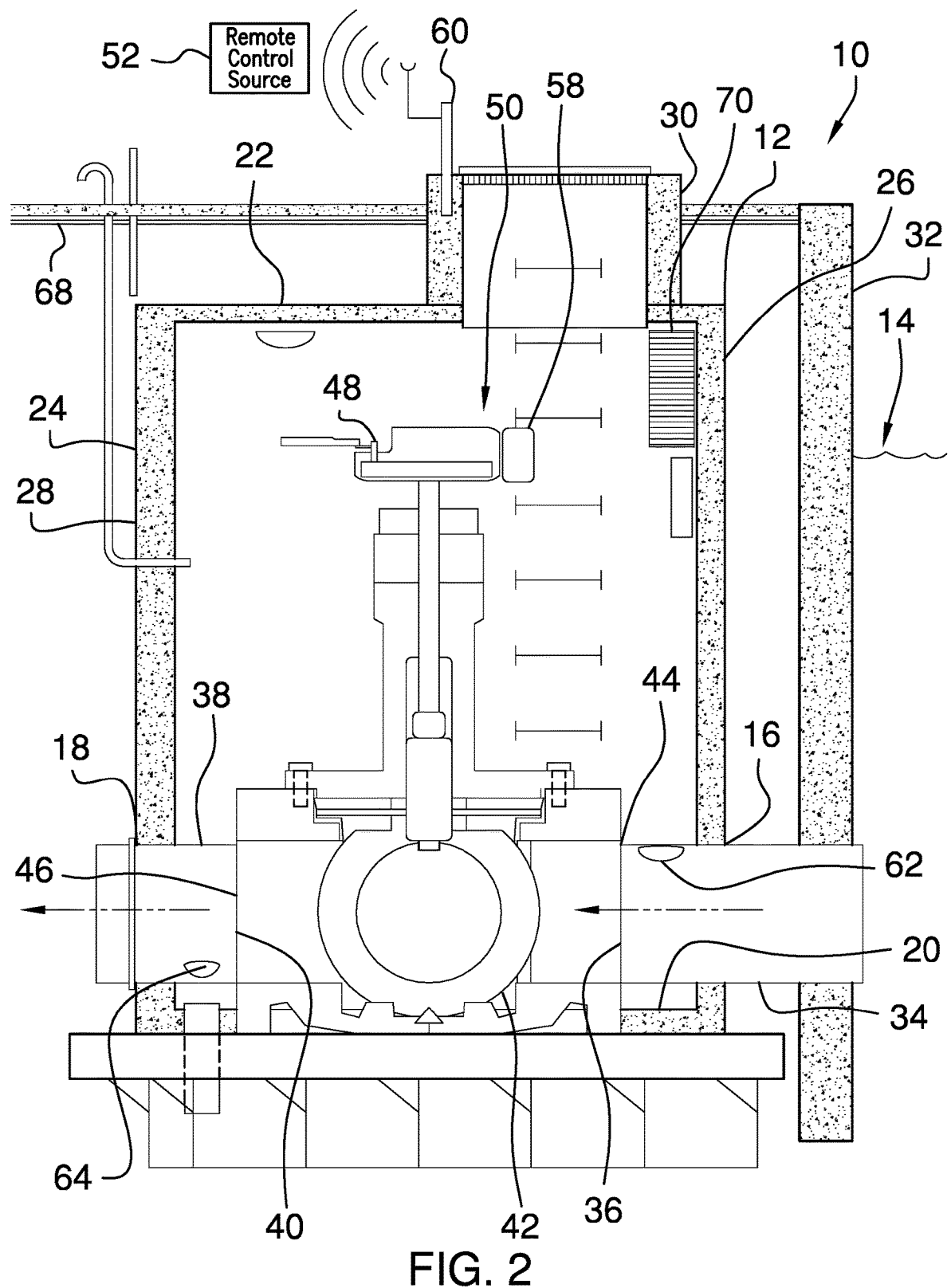
FIG. 2 is a cutaway view of subterranean vault and ball valve of an embodiment of the disclosure.

With reference now to the drawings, and in particular to FIGS. 1 through 3 thereof, a new floodwater device embodying the principles and concepts of an embodiment of the disclosure and generally designated by the reference numeral 10 will be described.

As best illustrated in FIGS. 1 through 3, the floodwater redistribution assembly 10 generally comprises a subterranean vault 12 that is positioned adjacent to a body of water 14 known to periodic flooding. The body of water 14 may be a river such as the Mississippi River, the Red River or any other river that is known to periodically flood and which has been known to cause a high degree of economic devastation. The subterranean vault 12 has an inlet 16 to direct water from the body of water 14 into the subterranean vault 12. Additionally, the subterranean vault 12 has an outlet 18 to direct the water from the body of water 14 outwardly from the subterranean vault 12.

The subterranean vault 12 has a lower wall 20, an upper wall 22 and an outer wall 24 extending therebetween, and the outer wall 24 has a front side 26 and a back side 28. The inlet 16 extends through the front side 26 and the outlet 18 extends through the back side 28. The upper wall 22 has an entrance 30 extending into an interior of the subterranean vault 12 to facilitate a service worker to enter the subterranean vault 12. The subterranean vault 12 includes a retaining wall 32 that is spaced from the front side 26 of the outer wall 24 to block water from the body of water 14. Moreover, the retaining wall 32 has a height that is greater than the distance between the lower wall 20 and the upper wall 22 of the subterranean vault 12. The subterranean vault 12 may be constructed of concrete, steel or other fluid impermeable material commonly employed in the construction of existing subterranean vaults. Additionally, the subterranean vault 12 may include structural features that are common to existing subterranean vaults, including a man hole, a man hole cover, a light, a ladder and other conventional structural elements.

An inlet pipe 34 is provided and the inlet pipe 34 is integrated into the subterranean vault 12. Moreover, the inlet pipe 34 is in fluid communication with the body of water 14 to direct the water from the body of water 14 into the subterranean vault 12. The inlet pipe 34 has an outlet end 36 that is positioned within the subterranean vault 12. An outlet pipe 38 is provided and the outlet pipe 38 is integrated into the subterranean vault 12 to direct the water from the inlet pipe 34 outwardly from the subterranean vault 12.

The outlet pipe 38 is in fluid communication with a predetermined location to direct the water to the predetermined location for the purposes of irrigation and municipal water service. Additionally, the outlet pipe 38 has an input end 40 that is positioned within the subterranean vault 12. The predetermined location may be the desert southwest of the continental United States or other geographic location that is commonly arid and subject to regular drought. Each of the inlet pipe 34 and the outlet pipe 38 may be water pipes with a diameter ranging between approximately 48.0 inches and 144.0 inches. Additionally, the outlet pipe 38 may be in fluid communication with a network of distribution pipes that are strategically oriented for delivering the flood waters to a variety of different destinations that are situated within the predetermined location.

A ball valve 42 is provided and the ball valve 42 is positioned within the subterranean vault 12. The ball valve 42 is in fluid communication with the inlet pipe 34 and the outlet pipe 38 such that the ball valve 42 receives the water from the inlet pipe 34. The ball valve 42 is positionable in a closed position to inhibit the water from flowing into the outlet pipe 38. Conversely, the ball valve 42 is positionable in an open position to facilitate the water to flow into the outlet pipe 38. The ball valve 42 has an inlet 44 and an outlet 46. The inlet 44 of the ball valve 42 is fluidly coupled to the outlet end 36 of the inlet pipe 34 and the outlet 46 of the ball valve 42 is fluidly coupled to the input end 40 of the outlet pipe 38.

The ball valve 42 includes an actuation mechanism 48 that is integrated therein such that the actuation mechanism 48 is accessible to the service worker. The actuation mechanism 48 manipulates the ball valve 42 between the open position and the closed position. In this way the actuation mechanism 48 facilitates the service worker to manually manipulate the ball valve 42 between the open position and the closed position. The actuation mechanism 48 may include a lever, a gear box and a drive shaft or other mechanical elements that are common to manually operated ball valves. Additionally, the ball valve 42 may be a fluid ball valve that is commonly employed in the control of fluid flow.

A ball valve control unit 50 provided and the ball valve control unit 50 is coupled to the ball valve 42. The ball valve control unit 50 is in mechanical communication with the ball valve 42 to control operation of the ball valve 42. Additionally, the ball valve control unit 50 is in remote communication with a remote control source 52. The remote control source 52 may be a centralized water control station that is occupied by a staff of water service personnel, such as a municipal water service facility or the like. The ball valve control unit 50 actuates the ball valve 42 between the open position and the closed position.

The ball valve control unit 50 comprises a control circuit 54 that is integrated into the ball valve control unit 50. The control circuit 54 receives an open input and a close input. Additionally, the control circuit 54 is electrically coupled to a power source 56. The power source 56 may comprise a municipal electrical grid or other type of extrinsic power supply system. As is most clearly shown in FIG. 3, the control circuit 54 may include an analog-digital converter, an electronic flash memory, a power control protector, a security authorization protolocation device, an EEPROM, a gate driver and any other electronic circuitry deemed necessary by electrical engineers to facilitate desired functionality of the control circuit 54.

The ball valve control unit 50 includes a motor 58 that is integrated into the ball valve 42 such that the motor 58 is in mechanical communication with the ball valve 42. The motor 58 rotates in a first direction for urging the ball valve 42 into the open position. Additionally, the motor 58 rotates in a second direction for urging the ball valve 42 into the closed position. The motor 58 is electrically coupled to the control circuit 54. Moreover, the motor 58 rotates in the first direction when the control circuit 54 receives the open input and the motor 58 rotates in the second direction when the control circuit 54 receives the close input. The motor 58 may comprise an electric motor or other similar type of motor that is capable of manipulating the ball valve 42.

The ball valve control unit 50 includes a transceiver 60 that is coupled to the entrance 30 of the subterranean vault 12 thereby facilitating the transceiver 60 to broadcast and receive an electromagnetic signal. The transceiver 60 is electrically coupled to the control circuit 54 and the transceiver 60 is in wireless communication with the remote control source 52. In this way the transceiver 60 can receive operational commands from the remote control source 52. The control circuit 54 receives the open input when the transceiver 60 receives an open command from the remote control source 52. Additionally, the control circuit 54 receives the close input when the transceiver 60 receives a close command from the remote control source 52. The transceiver 60 may comprise a radio frequency transceiver or the like. Moreover, the transceiver 60 may employ a WPAN signal and Bluetooth communication protocols.

The ball valve control unit 50 includes a pressure sensor 62 that is integrated into the inlet pipe 34 to sense pressure of the water in the inlet pipe 34. The pressure sensor 62 is electrically coupled to the control circuit 54 and the control circuit 54 receives the open input when the pressure sensor 62 senses pressure that exceeds a predetermined threshold. In this way the pressure sensor 62 facilitates flood waters to flow through the ball valve 42. Additionally, the control circuit 54 receives the close input when the pressure sensor 62 senses pressure that is below the predetermined threshold. In this way the pressure sensor 62 facilitates the ball valve 42 to inhibit normal water levels from flowing through the ball valve 42. The pressure sensor 62 may comprise an electronic fluid pressure sensor or the like and the predetermined threshold may be a water pressure that is calibrated to correlate with water pressure associated with water levels in the body of water 14 that exceed known and established flood levels.

The ball valve control unit 50 includes a flow sensor 64 that is integrated into the outlet pipe 38 to sense the flow of water through the outlet pipe 38. Additionally, the flow sensor 64 is electrically coupled to the control circuit 54. The transceiver 60 communicates a flow verification signal to the remote control source 52 to alert service workers that the ball valve 42 is functioning normally. The flow sensor 64 may be an electronic fluid flow sensor or the like.

The ball valve control unit 50 includes a data port 66 that is integrated into the ball valve control unit 50 and the data port 66 is electrically coupled to the control circuit 54. The data port 66 is electrically coupled to a data transmission conductor 68 thereby facilitating the control circuit 54 to receive data from the data transmission conductor 68. The data port 66 may comprise an RS-232 port, an RS-485 port or any other data port commonly associated with data transmission systems that are integrated with computer systems.

The ball valve control unit 50 includes at least one battery 70 that is positioned within the subterranean vault 12 and the at least one battery 70 is electrically coupled to the control circuit 54. The at least one battery 70 facilitates the control circuit 54 to receive operational voltage in the event of failure of the power source 56 to which the control circuit 54 is electrically coupled. In this way the at least one battery 70 facilitates continuous operation of the control circuit 54 in an emergency situation. FIG. 1 shows all of the possible components of circuitry and function of the ball valve control unit 50. FIG. 3 displays a logic tree that explains the functionality of the ball valve control unit 50 and the various decision making processes that are associated with opening and closing the ball valve 42 for controlling the flood waters.

In use, a plurality of the subterranean vault 12, the ball valve 42 and the ball valve control unit 50 may be provided and be located at strategic locations along an entire length of the body of water 14. The ball valve 42 is opened when the pressure sensor 62 senses that the water pressure in the inlet pipe 34 has exceeded the pressure associated with flood levels of water in the body of water 14. In this way the flood waters are directed into the output pipe for subsequent distribution to the predetermined location. In this way the desert southwest of the United States can benefit from an overabundance of water in the Midwest of the United States in the event that the Mississippi river is flooding, for example. Moreover, the Midwest of the United States is protected from economic devastation and property damage that is associated with flooding. The ball valve 42 is closed when the pressure sensor 62 no longer senses that the water pressure in the inlet pipe 34 exceeds the pressure associated with flood levels of water in the body of water 14. In this way the water level in the body of water 14 is continuously maintained at a level that is most beneficial for the health of the body of water 14 and the for the health and safety of communities that are located near the body of water 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A floodwater redistribution assembly for routing floodwaters from a natural body of water to predetermined locations for the purposes of irrigation and municipal water service, said assembly comprising:

a subterranean vault being configured to be positioned adjacent to a body of water known for periodic flooding, said subterranean vault having an inlet wherein said inlet is configured to direct water from the body of water into said subterranean vault, said subterranean vault having an outlet wherein said outlet is configured to direct the water from the body of water outwardly from said subterranean vault;

an inlet pipe being integrated into said subterranean vault wherein said inlet pipe is configured to be in fluid communication with the body of water for directing the water from the body of water into said subterranean vault;

an outlet pipe being integrated into said subterranean vault wherein said outlet pipe is configured to direct the water from said inlet pipe outwardly from said subterranean vault, said outlet pipe being in fluid communication with a predetermined location wherein said outlet pipe is configured to direct the water to the predetermined location for the purposes of irrigation and municipal water service;

a ball valve being positioned within said subterranean vault, said ball valve being in fluid communication with said inlet pipe and said outlet pipe wherein said ball valve is configured to receive the water from said inlet pipe, said ball valve being positionable in a closed position wherein said ball valve is configured to inhibit the water from flowing into said outlet pipe, said ball valve being positionable in an open position wherein said ball valve is configured to facilitate the water to flow into said outlet pipe; and a ball valve control unit being coupled to said ball valve, said ball valve control unit being in mechanical communication with said ball valve, said ball valve control unit being in remote communication with a remote control source, said ball valve control unit actuating said ball valve between said open position and said closed position, wherein said ball valve control unit comprises:

a control circuit being integrated into said ball valve control unit, said control circuit receiving an open input and a close input, said control circuit being electrically coupled to a power source; and a transceiver being coupled to an entrance of said subterranean vault, said transceiver being electrically coupled to said control circuit, said transceiver being in wireless communication with the remote control source for receiving operational commands from the remote control source, said control circuit receiving said open input when said transceiver receives an open command from the remote control source, said control circuit receiving said close input when said transceiver receives a close command from the remote control source.

2. The assembly according to claim 1, wherein said subterranean vault has a lower wall, an upper wall and an outer wall extending therebetween, said outer wall having a front side and a back side, said inlet extending through said front side, said outlet extending through said back side, said upper wall having said entrance of said subterranean vault extending into an interior of said subterranean vault wherein said entrance of said subterranean vault is configured to facilitate a service worker to enter said subterranean vault.

3. The assembly according to claim 2, wherein said subterranean vault includes a retaining wall being spaced from said front side of said outer wall wherein said retaining wall is configured to block water from the body of water, said retaining wall having a height being greater that the distance between said lower wall and said upper wall of said subterranean vault.

4. The assembly according to claim 1, wherein:
said inlet pipe has an outlet end being positioned within said subterranean vault;
said outlet pipe has an input end being positioned within said subterranean vault; and
said ball valve has an inlet and an outlet, said inlet being fluidly coupled to said outlet end of said inlet pipe, said outlet being fluidly coupled to said input end of said outlet pipe.

5. The assembly according to claim 1, wherein said ball valve includes an actuation mechanism being integrated therein wherein said actuation mechanism is configured to be accessible to the service worker, said actuation mechanism manipulating said ball valve between said open position and said closed position wherein said actuation mechanism is configured to facilitate the service worker to manually manipulate said ball valve between said open position and said closed position.

6. The assembly according to claim 1, wherein said ball valve control unit includes a motor being integrated into said ball valve such that said motor is in mechanical communication with said ball valve, said motor rotating in a first direction for urging said ball valve into said open position, said motor rotating in a second direction for urging said ball valve into said closed position, said motor being electrically coupled to said control circuit.

7. The assembly according to claim 6, wherein said motor rotates in said first direction when said control circuit receives said open input.

8. The assembly according to claim 6, wherein said motor rotates in said second direction when said control circuit receives said close input.

9. The assembly according to claim 1, wherein said ball valve control unit includes a pressure sensor being integrated into said inlet pipe wherein said pressure sensor is configured to sense pressure of the water in said inlet pipe, said pressure sensor being electrically coupled to said control circuit.

10. The assembly according to claim 9, wherein said control circuit receives said open input when said pressure sensor senses pressure that exceeds a predetermined threshold wherein said pressure sensor is configured to facilitate flood waters to flow through said ball valve.

11. The assembly according to claim 9, wherein said control circuit receives said close input when said pressure sensor senses pressure that is below the predetermined threshold wherein said pressure sensor is configured to facilitate said ball valve to inhibit normal water levels from flowing through said ball valve.

12. The assembly according to claim 7, wherein said ball valve control unit includes a flow sensor being integrated into said outlet pipe wherein said flow sensor is configured to sense the flow of water through said outlet pipe, said flow sensor being electrically coupled to said control circuit, said transceiver communicating a flow verification signal to the remote control source wherein said flow sensor is configured to alert service workers that said ball valve is functioning normally.

13. The assembly according to claim 1, wherein said ball valve control unit includes a data port being integrated into said ball valve control unit, said data port being electrically coupled to said control circuit, said data port being electrically coupled to a data transmission conductor thereby facilitating said control circuit to receive data from the data transmission conductor.

14. The assembly according to claim 1, wherein said ball valve control unit includes at least one battery being positioned within said subterranean vault, said at least one battery being electrically coupled to said control circuit, said at least one battery facilitating said control circuit to receive operational voltage in the event of failure of the power source to which said control circuit is electrically coupled thereby facilitating continuous operation of said control circuit.

15. A floodwater redistribution assembly for routing floodwaters from a natural body of water to predetermined locations for the purposes of irrigation and municipal water service, said assembly comprising:
a subterranean vault being configured to be positioned adjacent to a body of water known for periodic flooding, said subterranean vault having an inlet wherein said inlet is configured to direct water from the body of water into said subterranean vault, said subterranean vault having an outlet wherein said outlet is configured to direct the water from the body of water outwardly from said subterranean vault, said subterranean vault having a lower wall, an upper wall and an outer wall extending therebetween, said outer wall having a front side and a back side, said inlet extending through said front side, said outlet extending through said back side, said upper wall having an entrance extending into an interior of said subterranean vault wherein said entrance is configured to facilitate a service worker to enter said subterranean vault, said subterranean vault including a retaining wall being spaced from said front side of said outer wall wherein said retaining wall is configured to block water from the body of water, said retaining wall having a height being greater that the distance between said lower wall and said upper wall of said subterranean vault;
an inlet pipe being integrated into said subterranean vault wherein said inlet pipe is configured to be in fluid communication with the body of water for directing the water from the body of water into said subterranean vault, said inlet pipe having an outlet end being positioned within said subterranean vault;
an outlet pipe being integrated into said subterranean vault wherein said outlet pipe is configured to direct the water from said inlet pipe outwardly from said subterranean vault, said outlet pipe being in fluid communication with a predetermined location wherein said outlet pipe is configured to direct the water to the predetermined location for the purposes of irrigation and municipal water service, said outlet pipe having an input end being positioned within said subterranean vault;
a ball valve being positioned within said subterranean vault, said ball valve being in fluid communication with said inlet pipe and said outlet pipe wherein said ball valve is configured to receive the water from said inlet pipe, said ball valve being positionable in a closed position wherein said ball valve is configured to inhibit the water from flowing into said outlet pipe, said ball valve being positionable in an open position wherein said ball valve is configured to facilitate the water to flow into said outlet pipe, said ball valve having an inlet and an outlet, said inlet of said ball valve being fluidly coupled to said outlet end of said inlet pipe, said outlet of said ball valve being fluidly coupled to said input end of said outlet pipe, said ball valve including an actuation mechanism being integrated therein wherein said actuation mechanism is configured to be accessible to the service worker, said actuation mechanism manipulating said ball valve between said open position and said closed position wherein said actuation mechanism is configured to facilitate the service worker to manually manipulate said ball valve between said open position and said closed position; and a ball valve control unit being coupled to said ball valve, said ball valve control unit being in mechanical communication with said ball valve, said ball valve control unit being in remote communication with a remote control source, said ball valve control unit actuating said ball valve between said open position and said closed position, said ball valve control unit comprising:

a control circuit being integrated into said ball valve control unit, said control circuit receiving an open input and a close input, said control circuit being electrically coupled to a power source;

a motor being integrated into said ball valve such that said motor is in mechanical communication with said ball valve, said motor rotating in a first direction for urging said ball valve into said open position, said motor rotating in a second direction for urging said ball valve into said closed position, said motor being electrically coupled to said control circuit, said motor rotating in said first direction when said control circuit receives said open input, said motor rotating in said second direction when said control circuit receives said close input;

a transceiver being coupled to said entrance of said subterranean vault, said transceiver being electrically coupled to said control circuit, said transceiver being in wireless communication with the remote control source for receiving operational commands from the remote control source, said control circuit receiving said open input when said transceiver receives an open command from the remote control source, said control circuit receiving said close input when said transceiver receives a close command from the remote control source;

a pressure sensor being integrated into said inlet pipe wherein said pressure sensor is configured to sense pressure of the water in said inlet pipe, said pressure sensor being electrically coupled to said control circuit, said control circuit receiving said open input when said pressure sensor senses pressure that exceeds a predetermined threshold wherein said pressure sensor is configured to facilitate flood waters to flow through said ball valve, said control circuit receiving said close input when said pressure sensor senses pressure that is below the predetermined threshold wherein said pressure sensor is configured to facilitate said ball valve to inhibit normal water levels from flowing through said ball valve;

a flow sensor being integrated into said outlet pipe wherein said flow sensor is configured to sense the flow of water through said outlet pipe, said flow sensor being electrically coupled to said control circuit, said transceiver communicating a flow verification signal to the remote control source wherein said flow sensor is configured to alert service workers that said ball valve is functioning normally;

a data port being integrated into said ball valve control unit, said data port being electrically coupled to said control circuit, said data port being electrically coupled to a data transmission conductor thereby facilitating said control circuit to receive data from the data transmission conductor; and at least one battery being positioned within said subterranean vault, said at least one battery being electrically coupled to said control circuit, said at least one battery facilitating said control circuit to receive operational voltage in the event of failure of the power source to which said control circuit is electrically coupled thereby facilitating continuous operation of said control circuit.

\* \* \* \* \*